Sept. 10, 1957     V. J. DEAS, JR     2,806,120
ELECTRIC OVEN CONTROL SYSTEM
Filed May 29, 1956
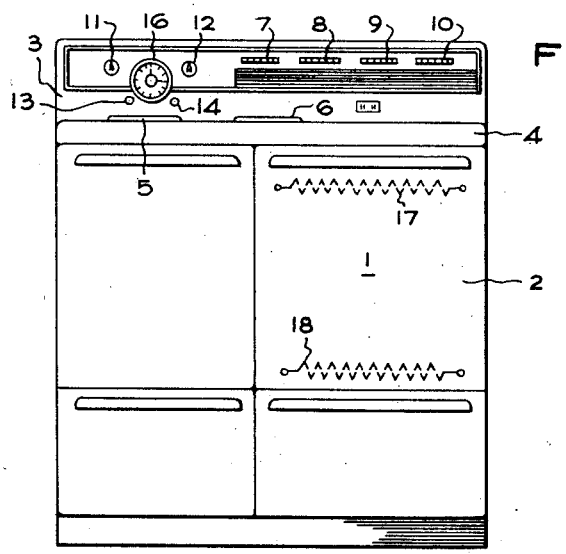
FIG. 1
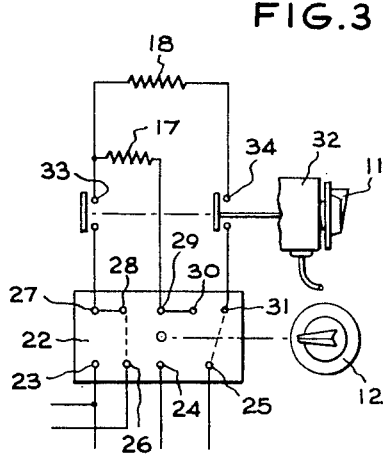
FIG. 3
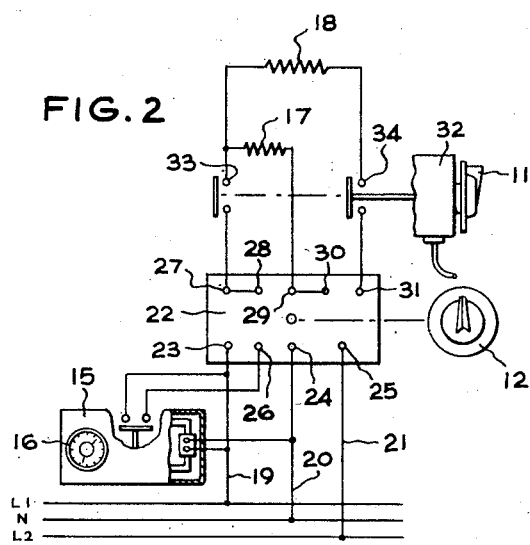
FIG. 2
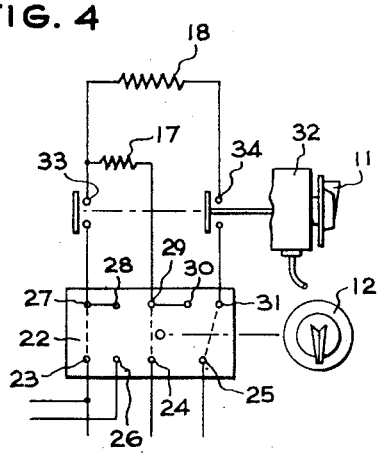
FIG. 4
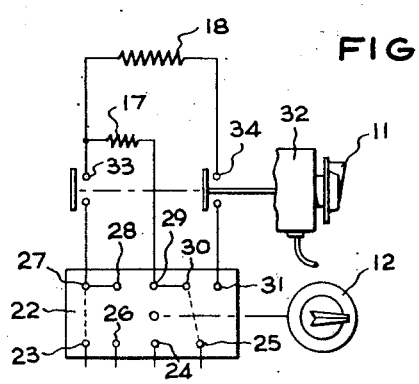
FIG. 5
*INVENTOR.*
VANN J. DEAS, JR
BY 
HIS ATTORNEY

United States Patent Office 2,806,120
Patented Sept. 10, 1957

2,806,120

ELECTRIC OVEN CONTROL SYSTEM

Vann J. Deas, Jr., Louisville, Ky., assignor to General Electric Company, a corporation of New York Application May 29, 1956, Serial No. 587,978

1 Claim. (Cl. 219—20)

This invention relates to electric oven control systems, and more particularly to an oven control arrangement including a timer switch providing timed baking operations.

The principal object of the present invention is to provide an oven control system including an improved and simplified arrangement for energizing and de-energizing the oven heating units under the control of a timer switch.

Further objects and advantages of this invention will become apparent as the following description proceeds, and the features of novelty which characterize the invention will be pointed out with particularity in the claim annexed to and forming a part of this specification.

Briefly stated, I have discovered that a heat source in the upper portion of an oven, which is particularly important in the baking of pies, cakes and other baked goods, is not essential during roasting and baking operations of relatively long duration. During the latter operations the cooking time is generally sufficiently long to permit the temperature throughout the oven to stabilize and browning of the food may take place slowly, whereas in the baking of a pie for example, relatively high oven temperature plus some top heat is necessary to achieve proper browning. Thus I have found that the upper oven heating unit need not be energized during those cooking operations of the type ordinarily controlled by a time switch. In accordance with one aspect of my invention, I have provided an electric oven including upper and lower units connected in a control circuit with an oven control switch and a timer switch so that only the upper unit is energized when the control switch is in its "broil" position, only the lower unit is energized when the control switch is in its "timed bake" position, and in the "regular bake" position of the control switch the lower unit is energized at full wattage and the upper unit at a reduced wattage sufficient to supply necessary top heat for ordinary baking operations.

For a better understanding of my invention reference may be made to the accompanying drawing in which:

Fig. 1 is a front elevation view of an electric range embodying my invention.

Fig. 2 is a diagrammatic view of the oven control system of my invention.

Fig. 3 is similar to Fig. 2 but shows the oven control switch in its timed bake position.

Fig. 4 is similar to Fig. 2 but shows the oven control switch in its regular bake position.

Fig. 5 is similar to Fig. 2 but shows the oven control switch in its broil position.

Referring now to the drawing, there is shown in Fig. 1 an electric range including an electric oven 1 comprising the usual insulated walls defining a heating compartment having a front opening closed by an oven door 2. As shown, the range may include a backsplasher 3 on which the usual surface heating unit switches and oven heating unit controls may be conveniently located, and a cooking top 4 which supports surface heating units 5 and 6 and ordinarily two additional units (not shown). The surface heating units are controlled by suitable switches such as push button switches 7, 8, 9 and 10 mounted on backsplasher 3.

Also mounted on backsplasher 3 are the oven controls including a control knob 11 for setting the desired oven temperature, a control knob 12 for selecting the type of cooking to be performed, and setting knobs 13 and 14 of an oven timer switch 15 provided with a clock face 16.

Mounted in the upper portion of oven 1 is an electric broiling unit 17 arranged to supply radiant heat to food supported in the oven and also some top heat during baking operations. Baking heat is supplied to the oven by an electric baking unit 18 preferably located adjacent the bottom wall of the heating compartment. Broiling unit 17 and baking unit 18 may be of any suitable construction, but are preferably sheathed heating units of the type including a tubular sheath surrounding a coiled electrical resistance conductor insulated therefrom by heat conducting insulating material such as magnesium oxide.

Referring to Fig. 2, the oven control system for heating units 17 and 18 includes three input conductors 19, 20 and 21 for supplying energy from a three-wire electrical distribution system, energized at 230/115 volts A. C., for example, having a pair of outer lines L1, L2, and a neutral line N. Conductors 19, 20 and 21 are connected to the input terminals of an oven control switch 22 which may be of any suitable multiple-pole, multiple position type, such as the switch disclosed in Patent 2,203,236—Randolph et al., issued June 4, 1940. Switch 22 is illustrated diagrammatically in Fig. 2 as having input terminals 23, 24 and 25 and also a fourth input terminal 26 which forms part of a bypass circuit to be described. Switch 22 also includes output terminals 27, 28, 29, 30 and 31 which may be interconnected with input terminals 23, 24, 25 and 26 in various combinations, as illustrated in Figs. 3, 4 and 5, to provide the various heating circuits of the present invention.

Also forming a part of my oven control circuit is a thermostat 32 connected in circuit with baking unit 18 and broiling unit 17 so as to regulate the supply of current thereto in accordance with the temperature in the oven heating compartment. Finally, it will be noted that timer 15 is connected to a bypass circuit between conductor 19 and terminal 26 of switch 22 so that terminal 26 is energized at the voltage impressed on line L1 whenever the timer contacts are closed. Referring to the circuits for energizing the oven heating units under the control of thermostat 32, broiling unit 17 is connected across output terminals 27 and 29 in series with one set of thermostat contacts 33 while baking unit 18 is connected across terminal 27 and 31 under the control of both contacts 33 and 34 of thermostat 32.

Turning to the various circuits provided by control switch 22, the regular bake circuit is illustrated in Fig. 4 wherein contacts 23 and 27 are interconnected, contacts 24 and 29 are interconnected, and also contacts 25 and 31 are interconnected. Thus when control switch 22 is in its regular bake position, there is completed a heating circuit connecting baking unit 18 across outer lines L1 and L2 of the power supply system and broiling unit 17 across outer line L1 and neutral line N, thus providing energization of the baking unit at its rated wattage and energization of the broiling unit at one-quarter rated wattage; so as to provide bottom heating supplemented by some heating in the top of the oven. In its time bake position, shown in Fig. 3, switch 22 is arranged so that input terminal 26 is connected with output terminals 27 and 28, and input terminal 25 is connected to output terminal 31. Thus in this position only baking unit 18 may be energized, being connected in series with timer switch 15 across outer supply lines L1 and L2, so that this heating circuit is prepared for subsequent energization upon closure of the contacts of timer 15. In the broil position of switch 22 as illustrated in Fig. 5, input terminal 23 is connected to output terminal 27 and input terminal 25 is connected to output terminal 30, thus completing a third heating circuit connecting broiling unit 17 across outer supply lines L1 and L2.

From the foregoing description it will be evident that by eliminating energization of broiling unit 17 during timed bake operations, an additional set of timer contacts otherwise needed for the neutral line conductor 20 and an additional set of contacts in the control switch 22 otherwise needed to interconnect terminals 24 and 29, and the associated wiring have all been eliminated. Nevertheless my improved circuit performs all of the functions required for regular non-timed baking operations, timed baking operations, and broiling operations, with this simplified and less expensive arrangement.

While I have shown and described a specific embodiment of my invention, I do not desire my invention to be limited to the particular construction shown and described, and I intend by the appended claim to cover all modifications within the true spirit and scope of my invention.

What I claim is:

An electric oven comprising walls defining a heating compartment, an electric broiling unit in the upper portion of said compartment, an electric baking unit associated with said compartment, a plurality of input conductors for supplying energy to said broiling and baking units from a three wire electrical distribution system having first and second outer lines and a neutral line, a control switch having regular bake and timed bake and broil positions connected to said input conductors and in circuit with said baking and broiling units, thermostatic means connected in circuit with said baking and broiling units for regulating the supply of energy thereto in accordance with the temperature in said compartment, a by-pass input circuit connecting said first outer line and said control switch, a timer switch in said by-pass circuit adapted to be set manually to desired on and off times and operable to close and open said by-pass circuit at pre-set on and off times, said control switch including means operable when in its regular bake position to complete a first heating circuit connecting said baking unit across said outer lines and said broiling unit across said first outer line and said neutral line, means operable when said control switch is in its timed bake position to complete a second heating circuit connecting said only baking unit in series with said timer switch across said outer lines, and means operable when said control switch is in its broil position to complete a third heating circuit connecting said broiling unit across said outer lines.

References Cited in the file of this patent

UNITED STATES PATENTS

| | | |
|---|---|---|
| 2,276,930 | Clark | Mar. 17, 1942 |
| 2,392,166 | Lockwood | Jan. 1, 1946 |
| 2,515,427 | Schulze | July 18, 1950 |
| 2,654,824 | Schroeder | Oct. 6, 1953 |